July 8, 1958  W. G. BEARDEN ET AL  2,842,449
EMULSION CEMENT
Filed Aug. 13, 1956
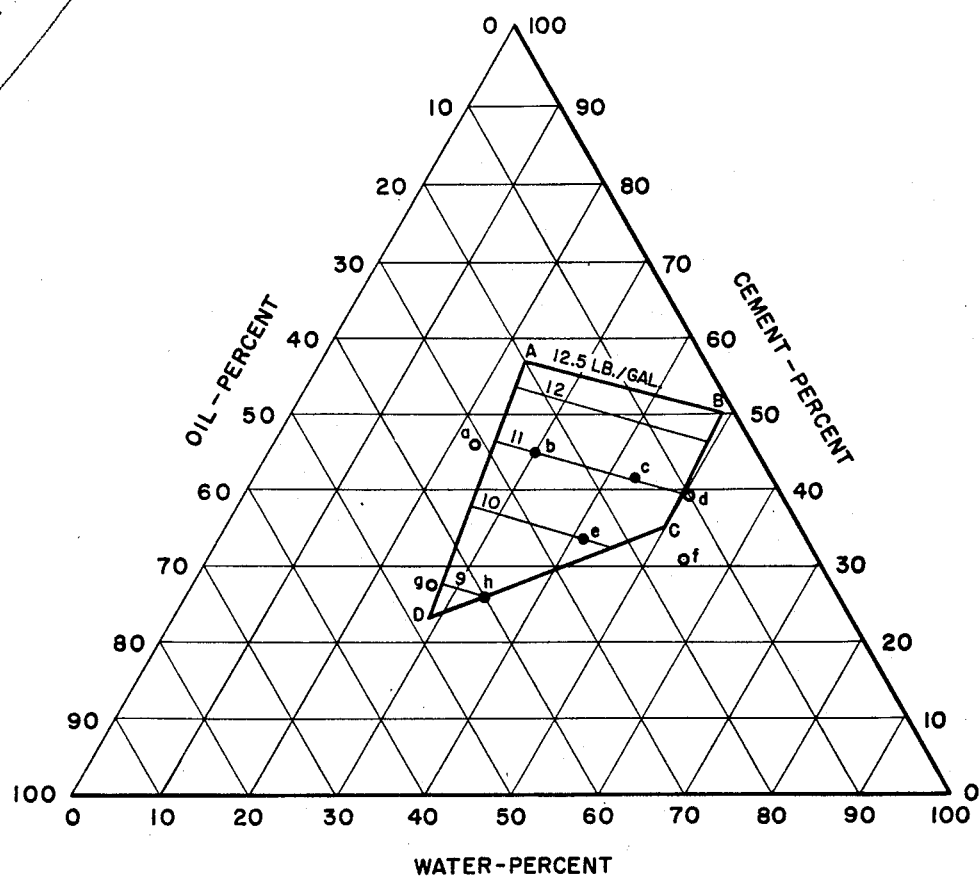
INVENTORS
WILLIAM G. BEARDEN
GEORGE C. HOWARD
BY ROBERT B. EVANS III
ATTORNEY

United States Patent Office 2,842,449
Patented July 8, 1958

2,842,449

EMULSION CEMENT

William G. Bearden, George C. Howard, and Robert B. Evans III, Tulsa, Okla., assignors to Pan American Petroleum Corporation, a corporation of Delaware Application August 13, 1956, Serial No. 603,783

2 Claims. (Cl. 106—90)

This invention relates to cementing operations in wells. More particularly, it relates to well cementing operations in which a lightweight cement slurry is required.

In many wells, if normal cement slurries weighing 14 to 16 pounds per gallon are employed to cement casing or plug back the well, sufficient pressure is imposed on the formation due to high hydrostatic head and pump pressure to cause large volumes of slurry to be lost to the formation. In many instances, this is probably due to fracturing of the formation. In such cases it is desirable to use a lightweight cement slurry sometimes weighing as little as the drilling fluids normally used to drill such formations. Such densities may be as low as 9 or 10 pounds per gallon.

The density of cement slurries can be decreased by simply adding water. Suitable cement slurries having densities as low as about 12.5 pounds per gallon can be prepared by this method. If additional water is added to such slurries to further decrease the density, however, the slurries became so thin that cement settles readily from the water. Another way of decreasing densities of cement slurries has been to employ lightweight cellular additives such as expanded perlite, or the like. At surface pressures slurries having densities as low as about 11 pounds per gallon can be prepared by use of such additives. At bottom hole pressures, however, the cells break open and are filled with liquids. Two undesirable effects result: first, the density of the slurry is greatly increased; and second, the additives absorb much of the water contained in the slurry causing excessive thickening.

Thickeners such as gums, starch, bentonite, and the like, have been included in slurries to thicken the water so it will suspend cement particles and prevent their settling when large water/cement ratios are used. This method has been widely employed to produce slurries down in the range of 12 pounds per gallon. These thickeners generally greatly reduce the tensile strength of the set cement and produce erratic setting tendencies. Therefore, it is usually not advisable to prepare cement slurries having densities less than 12 pounds per gallon by this method.

Efforts have been made to decrease the density of cement slurries by adding a little oil to the slurry. Most slurries will tolerate a few percent of oil, but experience with such emulsions containing as much as 5 percent oil has generally indicated that most emulsions are either unstable or that the cement settles badly from the emulsions. Efforts have been made to stabilize such emulsions by use of emulsifying agents such as the sodium soaps of fatty acids. Such emulsifying agents, however, generally adversely affect the properties of the slurry and of the set cement.

With the above problems in mind, an object of this invention is to prepare a lightweight aqueous cement slurry having density less than about 12.5 pounds per gallon for well cementing operations. A more specific object is to prepare a lightweight aqueous cement slurry containing little, if any, additives which affect the setting characteristics of the cement.

In general, we have found that the objects of our invention can be accomplished by mixing oil, water, and Portland cement within certain critical limits. We have found that certain mixtures of oil, water, and cement form surprisingly stable lightweight emulsions in the absence of added emulsifiers and suspending agents so long as critical limits are observed. Thus, the objectionable effects of emulsifying and suspending agents can be avoided by employing compositions within these limits.

The drawing indicates the limits of the compositions suitable for use in well cementing operations. In this drawing, lines AB, BC, CD and DA, define the limits of the range of compositions suitable for well cementing.

Compositions along line AB have a density of about 12.5 pounds per gallon. There is little point in using oil in aqueous cement slurries of greater densities since such slurries can be prepared by simply using sufficient water in the slurry to produce the desired density. If Portland cement slurries are diluted with sufficient water to produce densities less than about 12.5 pounds per gallon, however, the cement, as previously noted, tends to settle from the slurry to such a degree that these slurries should not be used for well cementing operations. Since no particular problem exists in forming cement slurries having densities greater than about 12.5 pounds per gallon, line AB defines the upper limit of compositions which solve a problem and thus defines the limit of compositions in which our invention is effective to solve such problems. The lines parallel to line AB indicate compositions having densities in pounds per gallon as noted on the lines.

Line AD represents the dividing line between compositions which form stable emulsions and those which form unstable emulsions. Compositions falling to the left of line AD form very unstable emulsions in which the oil droplets coalesce rapidly to form large bodies of oil which separate from the remaining aqueous slurry of cement. In addition, compositions to the left of line AD tend to have undesirably high viscosities.

Line BC divides compositions which are satisfactory from those which are unsatisfactory for another reason. Compositions to the right of line BC may be reasonably stable emulsions but have insufficient viscosity and shear strength to prevent settling of the cement from the emulsion. Compositions to the left of line BC on the other hand, form emulsions having sufficient suspending power to support the cement particles. Thus the cement tends to stabilize such emulsions which, in turn, are capable of maintaining the cement in suspension. The position of line DC is not governed by a property of the emulsion itself. That is, some compositions falling below line CD, and between extensions of lines AD and BC, form perfectly stable emulsions which are capable of supporting the cement. Upon setting, however, compositions falling below line CD have insufficient strength for most well cementing purposes. Line CD defines compositions which have a tensile strength of about 20 pounds per square inch when cured for 24 hours at 140° F. The briquettes for the tests were formed and the tests were made as described in ASTM test C190–49 (1955). Compositions above line CD have tensile strengths greater than 20 pounds per square inch and are therefore suitable for use in well cementing operations such as casing cementing, plugback, and squeeze cementing.

Any of the Portland cements can be employed which do not contain additives such as sulfonates, affecting the properties of the emulsion with water and oil. This includes all the Portland cements which contain no additives together with some which contain additives such as inorganic salts, inert solids, and the like, having no substantial effect on the emulsion properties.

The water may likewise be any water, whether fresh or salty, normally considered suitable for forming cement slurries for well cementing operations.

The oil should be crude petroleum or a fraction thereof. To avoid vaporization of the oil which may establish an undesirable degree of permeability in the cement while it is setting, the oil should be nonvolatile. By this term we mean any crude petroleum or fraction thereof having a vapor pressure less than the pressure under which the cement slurry is to set in the well. Normally, a light oil fraction such as kerosene or diesel fuel is most desirable. Gasoline is too volatile for most purposes and, in addition, is to be avoided due to its inflammable nature. Many crude oils have light ends which are too volatile and some contain an undesirable amount of natural emulsifying agents. Most crude oils should be avoided for these reasons.

In addition to the three principal ingredients, a little relatively inert material may also be present. For example, as previously noted, the water may contain inorganic salts or the cement may contain a small amount of inert solids. The composition, however, should consist essentially of only the three ingredients if the limits of the composition are to be valid. When the expression "a composition consisting essentially of oil, water, and cement" is used hereinafter, it is intended to mean a composition containing only these three ingredients plus materials such as salts, inert solids, set retarders, and the like, having substantially no effect on the properties of the emulsion or on the final tensile strength of the set cement. Such materials may or may not be present. If present, they should make up no more than about 5 percent by weight of the emulsion.

Compositions falling within our limits may be prepared by mixing the ingredients in any order. That is, any two ingredients may first be mixed together followed by mixing in the third ingredient or all three may be blended together at the same time. A convenient means of mixing includes first, feeding the oil and water simultaneously into the feed of a pump in the desired ratio. This pump forces the mixture of liquids through the jet of a jet mixer into which the desired amount of cement is fed through the hopper. The mixture then flows on down the well. This method is suitable for compositions near the center of figure ABCD shown in the accompanying drawing. If a composition near one border of the figure is to be prepared, however, the ratios of ingredients becomes critical. Accordingly, it will generally be advisable to mix most of the ingredients together first and then carefully adjust the composition to the exact formula desired before it is pumped down the well. Other types of mixing, such as by motor-driven propellers, may be used if desired. The speed of mixing is not particularly critical except that the stirring time when using slow-speed stirrers should be longer than when high-speed stirrers are used.

Our invention will be better understood from consideration of the following example:

EXAMPLE

To define the limits of operable emulsions of oil, water, and Portalnd cement, several compositions were prepared. The oil in these compositions was kerosene having a specific gravity of about 0.8 compared to water. The water was fresh drinking water. The cement was Dewey Portland cement of API Class A, ASTM Type I. Each composition was mixed for about 1 minute in a Waring-Blendor after which the mixture was observed to determine whether the emulsion was stable and whether the cement tended to settle out. If the emulsion was stable and held the cement in suspension a briquette was formed, the briquette was cured for 24 hours at 140° F. and the tensile strength was determined in accordance with ASTM test C190–49. The results are presented in Table I.

*Table 1*

| Test | Cement | | Water | | | Kerosene | | | Density, lb./gal. | Tensile, Str., lb./in.² | Remarks |
|---|---|---|---|---|---|---|---|---|---|---|---|
| | Wt., lb. | Wt., percent | cc. | Wt., lb. | Wt., percent | cc. | Wt., lb. | Weight percent | | | |
| a | .64 | 46 | 145 | .320 | 23 | 245 | .432 | 31 | 11 | | Oil separated. |
| b | .62 | 45 | 188 | .414 | 30 | 196 | .346 | 25 | 11 | 59 | |
| c | .57 | 41.5 | 271 | .597 | 43.5 | 117 | .206 | 15 | 11 | 26 | |
| d | .54 | 39.3 | 316 | .697 | 50.7 | 78 | .138 | 10 | 11 | | Cement settled but almost satisfactory. |
| e | .42 | 33.6 | 234 | .516 | 41.3 | 178 | .314 | 25.1 | 10 | 27 | |
| f | .38 | 30.3 | 312 | .688 | 54.8 | 106 | .187 | 14.9 | 10 | | Cement settled. |
| g | .31 | 27.5 | 140 | .309 | 27.4 | 288 | .508 | 45.1 | 9 | | Oil separated. |
| h | .29 | 25.8 | 174 | .384 | 34.1 | 256 | .452 | 40.1 | 9 | 20 | |

The compositions tested are plotted on the drawing. Of these compositions the ones designated b, c, e, and h, were considered to be satisfactory. Compositions represented by d and f were considered to be unsatisfactory since the cement settled from these compositions. In the case of composition d, however, the rate of settling was very slow so the composition was almost satisfactory. Compositions represented by a and g were considered to be unsatisfactory since the oil rapidly broke out of the emulsion. In the accompanying drawing, all unsatisfactory compositions, including borderline case d, are plotted as open circles. The satisfactory compositions are plotted as filled circles.

We claim:

1. A lightweight cement composition suitable for well cementing operations, said composition consisting essentially of nonvolatile mineral oil, water, and ASTM Portland cement, which are present in the relative percentages by weight lying within the area defined in the accompanying diagram by the lines AB, BC, CD, and DA.

2. The composition of claim 1 in which said Portland cement is API Class A, and said oil is kerosene.

References Cited in the file of this patent

UNITED STATES PATENTS

| | | |
|---|---|---|
| 1,601,295 | Collings | Sept. 28, 1926 |
| 1,772,999 | Huber | Aug. 12, 1930 |
| 2,285,302 | Patterson | June 2, 1942 |